United States Patent
Yamagishi et al.

(10) Patent No.: US 6,786,408 B2
(45) Date of Patent: Sep. 7, 2004

(54) COIN-TYPE IC CAR READER/WRITER (75) Inventors: Ryoji Yamagishi, Chiyoda-ku (JP); Shigeyuki Murai, Chiyoda-ku (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 62 days.

(21) Appl. No.: 09/894,415

(22) Filed: Jun. 28, 2001

(65) Prior Publication Data

US 2002/0003165 A1 Jan. 10, 2002

(30) Foreign Application Priority Data

Jul. 6, 2000 (JP) .......................................... 2000/205248

(51) Int. Cl.[7] .................................................. G06K 7/08
(52) U.S. Cl. ......................................................... 235/451
(58) Field of Search .............................. 235/451, 375, 235/380–381, 487, 477, 483, 492, 438, 454, 378, 494, 384; 194/210–213, 334, 344, 302, 902, 318, 317, 314; 40/275; 264/272

(56) References Cited

U.S. PATENT DOCUMENTS

| | | | | | |
|---|---|---|---|---|---|
| 4,354,587 A | * | 10/1982 | Davies | .......................... | 194/319 |
| 4,625,851 A | * | 12/1986 | Johnson et al. | .............. | 194/200 |
| 4,884,672 A | * | 12/1989 | Parker | ........................ | 194/318 |
| 4,984,670 A | * | 1/1991 | Merkle | ........................ | 194/317 |
| 5,096,039 A | * | 3/1992 | Abe | ............................ | 194/346 |
| 5,103,081 A | * | 4/1992 | Fisher et al. | ............. | 235/462.03 |
| 5,184,709 A | * | 2/1993 | Nishiumi et al. | ............ | 194/318 |
| 5,328,014 A | * | 7/1994 | Nishiumi et al. | ............ | 194/343 |
| 5,404,986 A | * | 4/1995 | Hossfield et al. | ............ | 194/317 |
| 5,487,459 A | * | 1/1996 | Farmont | ....................... | 194/213 |
| 5,511,645 A | * | 4/1996 | Glueck | ......................... | 194/203 |
| 5,575,374 A | * | 11/1996 | Orus et al. | ................... | 194/213 |
| 5,577,591 A | * | 11/1996 | Abe | ............................. | 194/343 |
| 5,637,859 A | * | 6/1997 | Menoud | ...................... | 235/492 |
| 5,684,597 A | * | 11/1997 | Hossfield et al. | ............ | 356/635 |
| 5,950,795 A | * | 9/1999 | Kojima | ........................ | 194/241 |
| 6,029,891 A | * | 2/2000 | Freeman et al. | ............. | 235/380 |
| 6,050,388 A | * | 4/2000 | Gautherot | .................... | 194/317 |
| 6,098,778 A | * | 8/2000 | Yeh | ............................. | 194/318 |
| 6,119,844 A | * | 9/2000 | Ali | .............................. | 194/203 |
| 6,260,686 B1 | * | 7/2001 | Rigo | ........................... | 194/210 |
| 6,508,700 B2 | * | 1/2003 | Mori et al. | .................... | 453/3 |
| 6,644,456 B2 | * | 11/2003 | Trenner | ...................... | 194/346 |
| 6,702,092 B2 | * | 3/2004 | Nakajima et al. | ............ | 194/302 |

FOREIGN PATENT DOCUMENTS

JP          411019330 A  *  1/1999  ............. A63F/9/00

* cited by examiner

*Primary Examiner*—Thien M. Le
*Assistant Examiner*—Edwyn Labaze
(74) *Attorney, Agent, or Firm*—Welsh & Katz, Ltd.

(57) ABSTRACT

A coin-type IC card reader/writer comprises a coin-type IC card distributing unit provided in a coin-type IC card guide path, for performing the processing of reading data from the coin-type IC card and writing data to the coin-type IC card while temporarily stopping the rolling movement of the coin-type IC card, and, based on results of the processing, distributing the coin-type IC card to another coin-type IC card guide path disposed separately from the first-mentioned coin-type IC card guide path.

11 Claims, 11 Drawing Sheets

COIN-TYPE IC CAR READER/WRITER

CROSS-REFERENCE TO RELATED APPLICATIONS

This application is based upon and claims the benefit of priority from the prior Japanese Patent Application no. 205248/2000 filed on Jul. 6, 2000; the entire contents of which are incorporated herein by reference.

BACKGROUND OF THE INVENTION

1. Field of the Invention

This invention relates to a coin type IC card reader/writer that performs processing to read data from and write data to a coin-shaped IC card known as a coin-type IC card.

2. Description of the Related Art

Coin-type IC cards have been in existence that are used instead of coins or play medals such as tokens and the like in game machines such as slot machines and the like, which are deposited inside the game machine to enable it to play. The coin-type IC card comprises an IC chip module for recording various kinds of data such as monetary data and performing computational processing thereon, and an antenna coil for supplying electric power to and inputting and outputting data to and from the IC chip without making contact with the IC card that is implanted in a disk-shaped (coin-shaped) body.

The game machine which uses such a coin-type IC card, is provided with a coin-type IC card reader/writer for performing processing to read data from and write data to the coin-type IC card, without making contact with the IC card.

Such a coin-type IC card reader/writer comprises at least an antenna coil for supplying electric power to and conducting data input and output to and from the coin-type IC card without making contact therewith, and a control unit for performing processing for reading data from and writing data to an IC chip module in the coin-type IC card.

In a game machine where such a coin-type IC card reader/writer is provided, when coin-type IC card is deposited and is rolling and passing along a guide path provided in the coin-type IC card reader/writer, monetary data previously stored inside the IC chip module in the coin-type IC card is accessed through the antenna coil thereof, and that monetary data is read out. Then, the read-out monetary data is compared with the monetary data required for the game. If the monetary data read out is larger than the monetary data required for the game, a signal to enable game execution is sent, the monetary data used for the game is subtracted from the monetary data read out, and processing is performed to write monetary data for the value resulting from the subtraction over the data in the IC chip module.

When the monetary data read out from the IC chip module in the coin-type IC card is compared to the monetary data required for the game and found that the monetary data read out is smaller than the monetary data required for the game, then the coin-type IC card is returned without executing the game and also without doing any processing to rewrite the existing monetary data.

In the conventional coin-type IC card reader/writer described above, the processing for reading data from and writing data to the coin-type IC card is performed while the coin-type IC card is being rolled and moved along inside the coin-type IC card guide path formed inside the coin-type IC card reader/writer, Therefore, there is a possibility that the processing to read data from and write data to the coin-type IC card will not be done in a definite manner, and that errors will occur in reading and writing data from and to the coin-type IC card. Further, there is also a possibility that problems will occur such that the coin-type IC card is returned without overwriting the existing monetary data in the way that that should be done.

SUMMARY OF THE INVENTION

In view of the situation described in the foregoing, an object of the present invention is to provide a coin-type IC card reader/writer that is fashioned so that errors in reading and writing data from and to coin-type IC cards is reduced to the fullest extent possible.

In order to attain that object, in the coin-type IC card reader/writer of the present invention, coin-type IC card distributing means are provided for temporarily stopping the rolling of the coin-type IC card in the coin-type IC card guide path and causing processing to be performed to read and write data to and from the coin-type IC card while it is stopped, and also, based on the results of that processing, for distributing the coin-type IC card that was temporarily stopped to coin-type IC card guide paths different from the coin-type IC card guide path noted above.

DESCRIPTION OF THE EMBODIMENTS

Embodiments of the coin-type IC card reader/writer according to the present invention is now described in detail.

Figure 1:
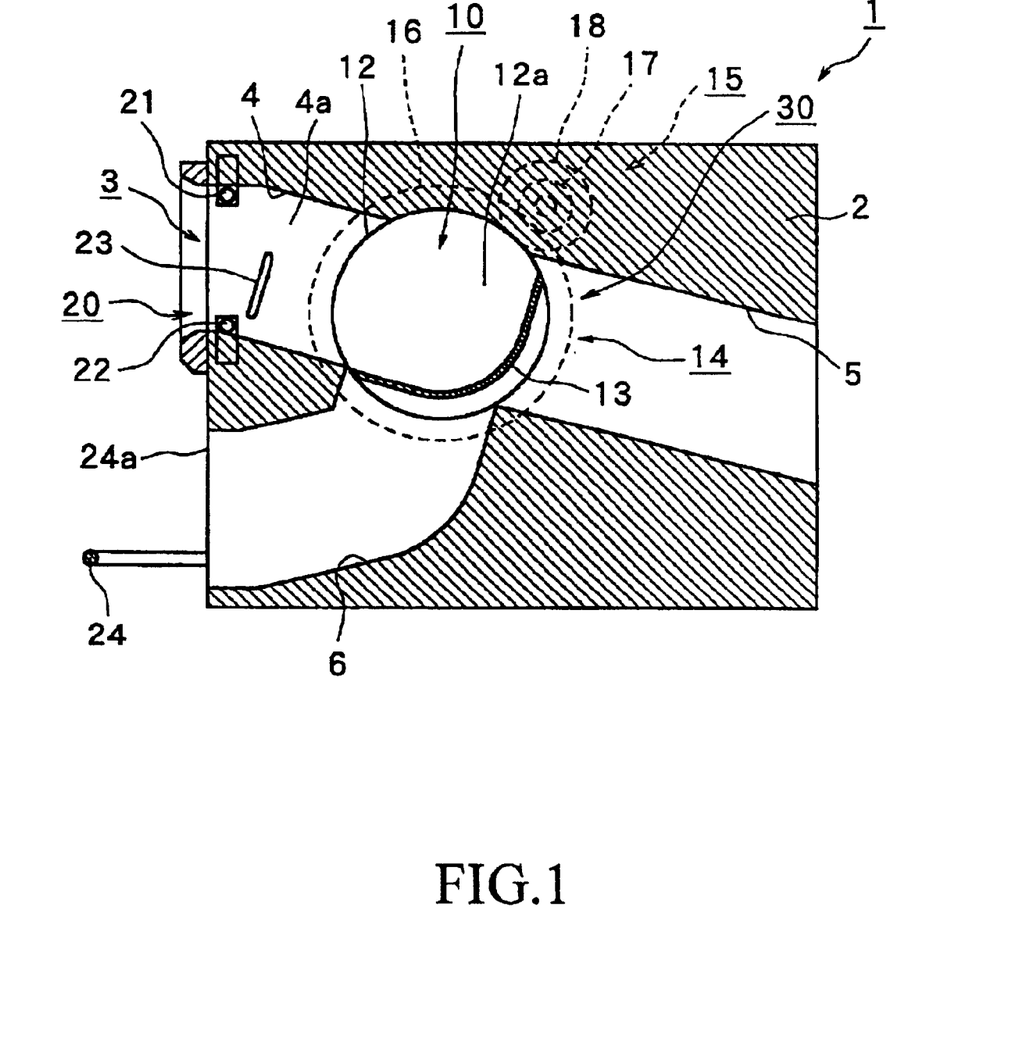
FIG. 1 is a front cross-sectional view of an embodiment of a coin-type IC card reader/writer according to the present invention.
Figure 2:
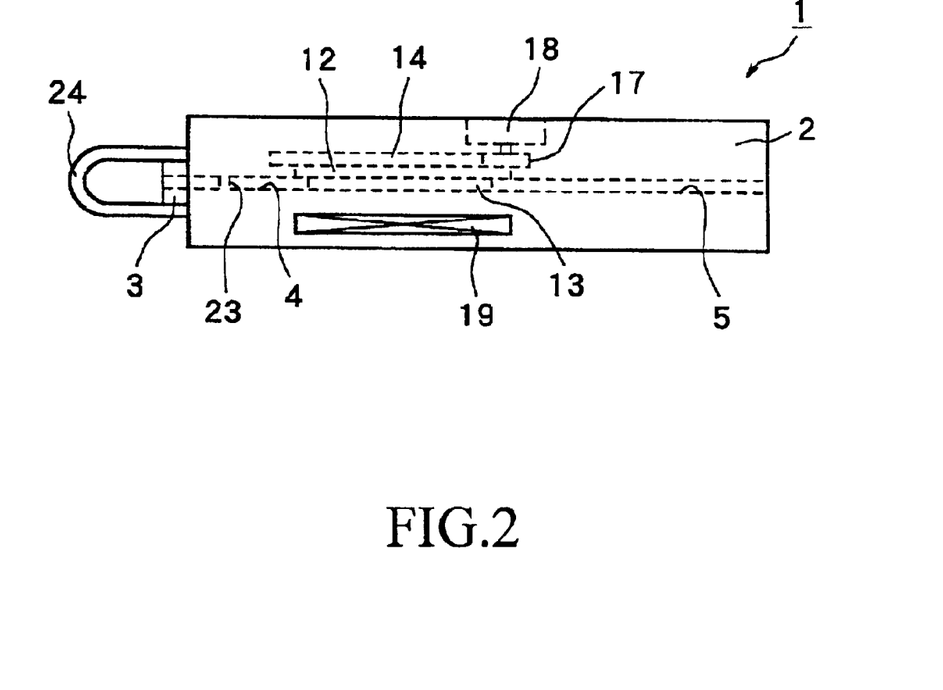
FIG. 2 is a plan of the embodiment of the coin-type IC card reader/writer.
Figure 3:
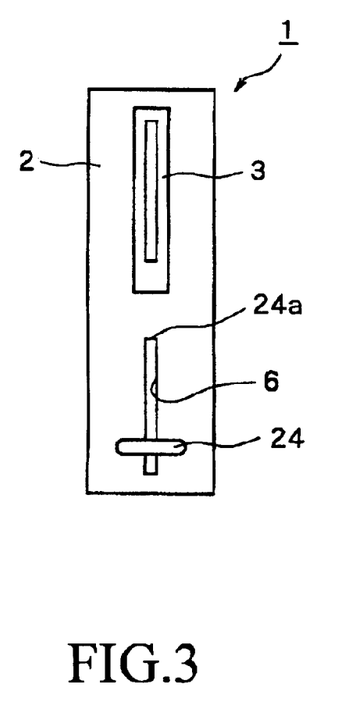
FIG. 3 is a left side view of the embodiment of the coin-type IC card reader/writer.

FIG. 1 is a front cross-sectional view of an embodiment of a coin-type IC card reader/writer 1 according to the present invention, FIG. 2 is a plan view and FIG. 3 is a left side view of the coin-type IC card reader/writer illustrated in FIG. 1.

As illustrated in FIG. 1, this coin-type IC card reader/writer 1 comprises a rectangular frame 2, an IC card deposit slot 3 formed in the left edge of the frame 2, a coin-type IC card guide path 4 connected to that coin-type IC card deposit slot 3, and a coin-type IC card collection path 5 and coin-type IC card return path 6 formed such that they branch from the downstream end of the coin-type IC card guide path 4.

At the branch point 30 of the coin-type IC card guide path 4, the coin-type IC card collection path 5 and the coin-type IC card return path 6, coin-type IC card distributing means 10 are provided which temporarily stop a coin-type IC card that is guided such that it rolls through the coin-type IC card guide path 4 and then distribute the temporarily stopped coin-type IC card to one or other of the coin-type IC card collection path 5 and coin-type IC card return path 6 that differ from the coin-type IC card guide path 4.

In FIG. 1, furthermore, reference numeral 20 indicates coin diameter detection means comprising a pair of photosensors 21 and 22 that detect whether or not a coin shaped object deposited in the IC card deposit slot 3 has a diameter of the prescribed size, while reference numeral 23 indicates a shutter that allows entry of the coin shaped object into the coin-type IC card guide path 4 based on a diameter detection signal from the coin diameter detection means 20. The shutter 23 normally protrudes from a side wall 4a of the coin-type IC card guide path 4, restricting entry of the coin shaped object into the coin-type IC card guide path 4. Reference numeral 24 in FIG. 1 is a positioning ring that positions and supports at a return slot 24a a coin shaped object returned through the coin-type IC card return path 6.

The coin-type IC card distributing means 10 comprise a shaft 12 that is turnably supported at the branch point 30 of the coin-type IC card guide path 4, the coin-type IC card collection path 5 and the coin-type IC card return path 6, and that configures the side walls of the branch point 30 with the leading end surface 12a thereof, a distributing unit 14 that is secured to the leading end surface 12a of the shaft 12 and that, in the initial position illustrated in FIG. 1, comprises a roughly L-shaped partition plate 13 that simultaneously blocks the upstream ends of the coin-type IC card collection path 5 and the coin-type IC card return path 6, respectively, and a drive unit 15 that turns the distributing unit 14.

This drive unit 15 comprises a follower gear 16 secured to the aft end of the shaft 12 and a motor 18 having a pinion gear 17 that engages that follower gear 16.

As illustrated in FIG. 2, an antenna coil 19 for supplying electric power to and performing data input and output to and from the coin-type IC card without making contact therewith is provided on one side inside the frame 2 at a position in opposition to the shaft 12.

The operation of the coin-type IC card reader/writer 1 described in the foregoing is next described and the configuration thereof is described in greater detail.

Figure 4:
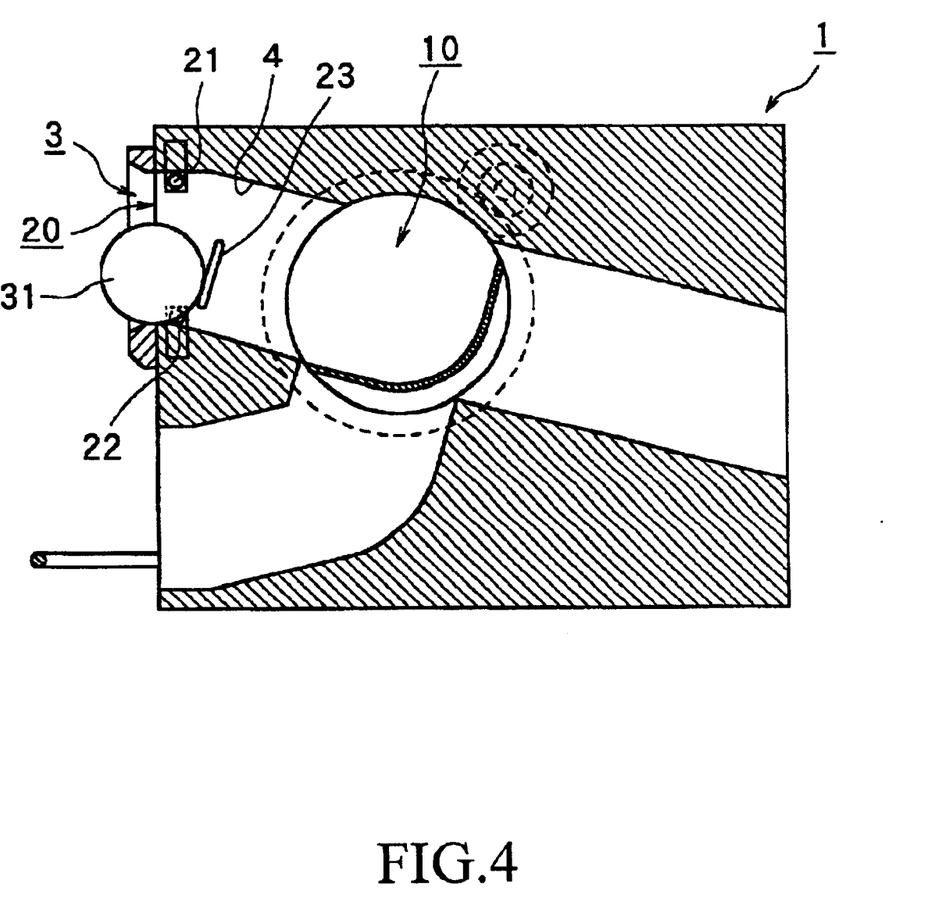
FIG. 4 is a front cross-sectional view illustrating the operation of the embodiment of the coin-type IC card reader/writer.

A coin shaped object 31 having a diameter smaller than the specific coin diameter is deposited in the IC card deposit slot 3, as illustrated in FIG. 4, where the same parts as in FIG. 1 are indicated by the same reference numerals.

When a coin shaped object 31 having a diameter smaller than the specific coin diameter is deposited in this manner into the IC card deposit slot 3, that coin shaped object 31 will only interrupt the lower sensor 22 of the pair of photosensors 21 and 22 configuring the coin diameter detection means 20. As a result, based on the detection signal from the coin diameter detection means 20, a control unit (not shown) judges that the coin shaped object 31 deposited is not a coin shaped object having a diameter of the prescribed size, and therefore maintains the restriction on the coin-type IC card guide path 4 by the shutter 23.

Accordingly, a coin shaped object 31 having a diameter smaller than the specific diameter will be prevented from entering the coin-type IC card guide path 4 by the shutter 23.

Figure 5:
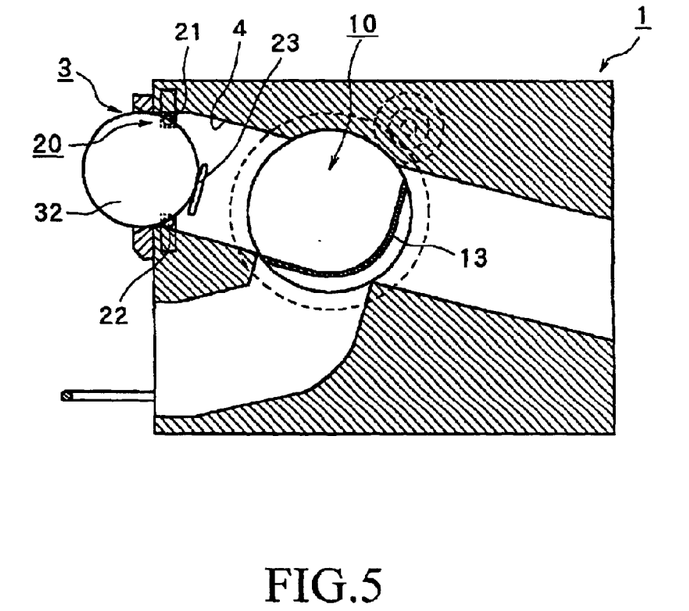
FIG. 5 is a front cross-sectional view illustrating the operation of the embodiment of the coin-type IC card reader/writer.

Next, when a coin-type IC card 32 having the specific diameter is deposited in the IC card deposit slot 3, as illustrated in FIG. 5, the coin-type IC card 32 will, due to its diameter, interrupt both of the pair of photosensors 21 and 22 configuring the coin diameter detection means 20. As a result, based on the detection signal from the coin diameter detection means 20, the control unit (not shown) will judge that the coin-type IC card 32 deposited is a coin shaped object having a diameter of the prescribed size, and therefore will release the restriction by the shutter 23 on the coin-type IC card guide path 4.

Figure 6:
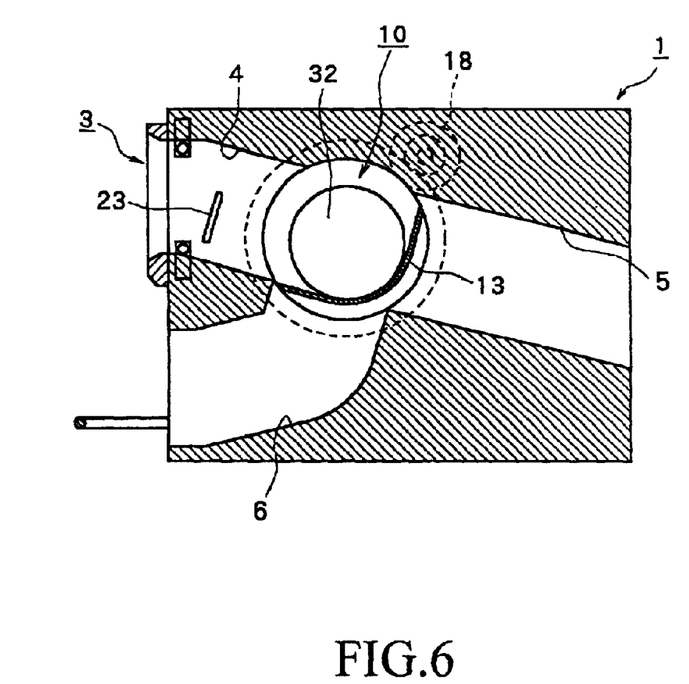
FIG. 6 is a front cross-sectional view illustrating the operation of the embodiment of the coin-type IC card reader/writer.

Thus, when the restriction on the coin-type IC card guide path 4 by the shutter 23 is released, the coin-type IC card 32, as illustrated in FIG. 6, rolls along the coin-type IC card guide path 4 and is guided downstream therein until it strikes the roughly L-shaped partition plate 13 that is positioned in the initial position so that it simultaneously blocks the upstream ends of the coin-type IC card collection path 5 and the coin-type IC card return path 6, where it stops.

After releasing the restriction by the shutter 23, the control unit (not shown) begins to supply electric power to and to input and output data to and from the coin-type IC card 32 that is stopped, as illustrated in FIG. 6, through the antenna coil 19 illustrated in FIG. 2.

When this is being done, the control unit, through the antenna coil 19, accesses monetary data stored beforehand in an IC chip module (not shown) imbedded in the coin-type IC card 32, reads out that monetary data, compares that read out monetary data with monetary data required for the game, sends out a signal to enable game execution if the read out monetary data is larger than the monetary data required for the game, subtracts the monetary data used for the game from the read out monetary data, and overwrites the existing data in the IC chip module with the monetary data of the value resulting from that subtraction.

When the writing of the monetary data of the value resulting from the subtraction to the coin-type IC card 32 by the control unit (not shown) has been completed, the control unit determines whether or not the monetary data having the value resulting from the subtraction is 0.

Figure 7:
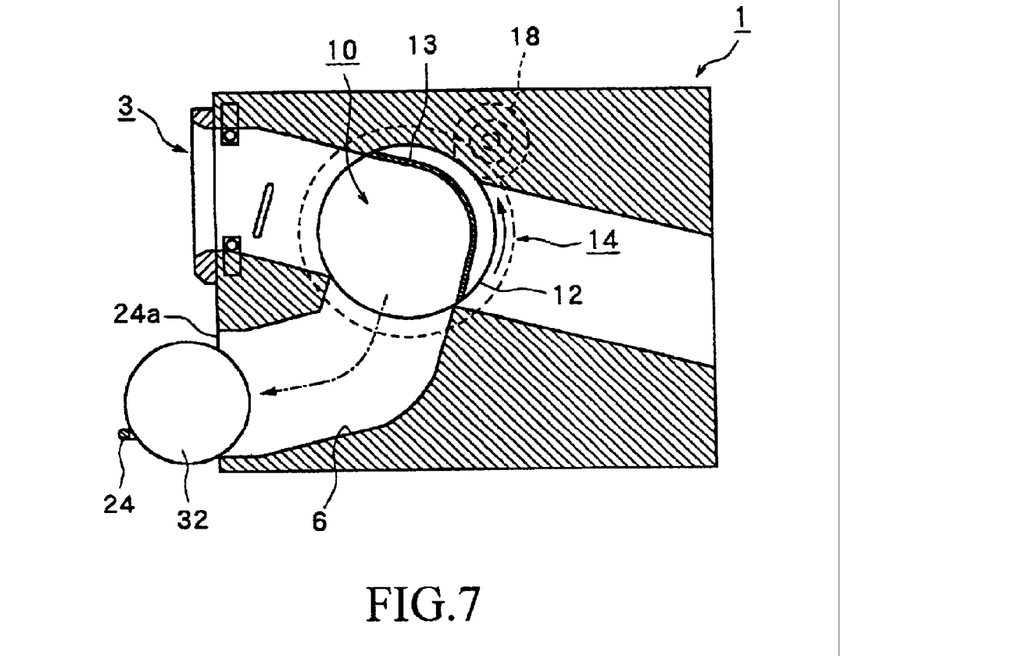
FIG. 7 is a front cross-sectional view illustrating the operation of the embodiment of the coin-type IC card reader/writer.

When the monetary data written to the coin-type IC card 32 is greater than 0, the control unit drives a motor 18 for the coin-type IC card distributing means 10 so that it turns in one direction, and thereby turns the shaft 12 of the distributing unit 14 through a prescribed turning angle in the counterclockwise direction, as illustrated in FIG. 7.

Thereupon, the partition plate 13 will also be turned through a prescribed turning angle in the counterclockwise direction, so that the upper end of the coin-type IC card return path 6 will be opened, wherefore the coin-type IC card 32 that was stopped by that partition plate 13 will roll through the coin-type IC card return path 6 to the card return slot 24a as indicated by the arrow, and be returned, arrested by the positioning ring 24.

Figure 8:
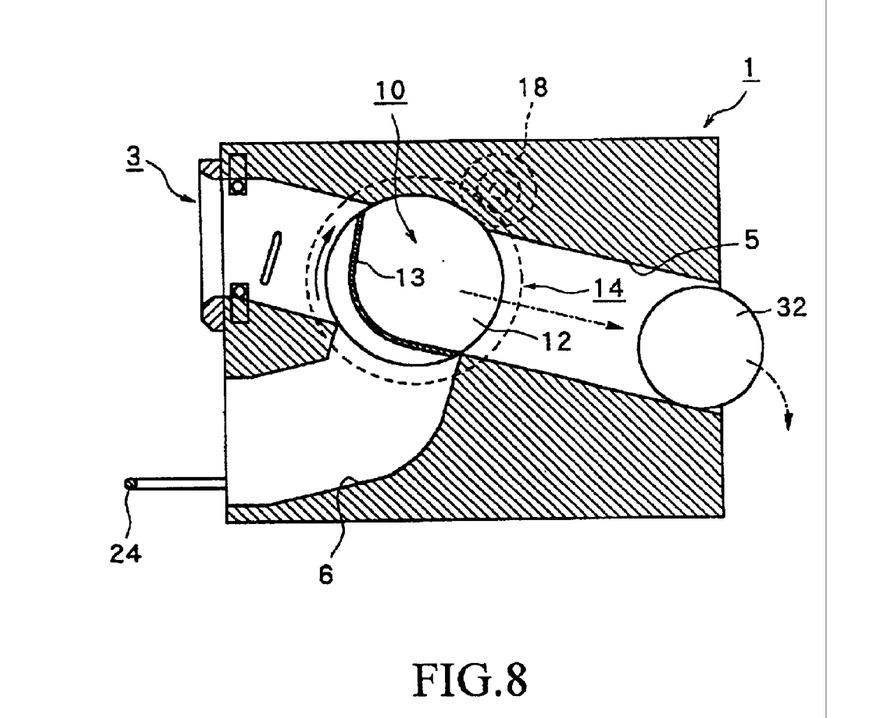
FIG. 8 is a front cross-sectional view illustrating the operation of the embodiment of the coin-type IC card reader/writer.

When the monetary data written to the coin-type IC card 32 is 0, on the other hand, the control unit drives the motor 18 of the coin-type IC card distributing means 10 so that it turns in the other direction, and thereby causes the shaft 12 of the distributing unit 14 to be turned through a prescribed turning angle, in the clockwise direction, as illustrated in FIG. 8.

When that happens, the partition plate 13 will also turn through a prescribed turning angle, in the clockwise direction, so the upstream end of the coin-type IC card collection path 5 will be opened, wherefore the coin-type IC card 32 stopped by the partition plate 13 will roll through the coin-type IC card collection path 5 as indicated by the arrow, as illustrated in FIG. 8, and will be collected in a coin-type IC card collection box (not shown) from the downstream end thereof.

The control unit (not shown), after causing the shaft 12 of the coin-type IC card distributing means 10 to turn through a prescribed turning angle, as described in the foregoing, drives the motor 18 of the coin-type IC card distributing means 10, after a prescribed time has elapsed, so that it turns, causing the shaft 12 of the distributing unit 14 to return to the initial position illustrated in FIG. 1, and thus returns to a condition for receiving the next coin-type IC card.

Furthermore, as illustrated in FIG. 6, the control unit (not shown), after starting to supply electric power to and inputting and outputting data to and from the coin-type IC card 32 that is temporarily stopped, when it has judged that the coin shaped object treated as a coin-type IC card 32 is not in fact a coin-type IC card, returns that coin shaped object to the card return slot 24a by the same process as illustrated in FIG. 7.

Furthermore, in the embodiment described in the foregoing, the coin-type IC card distributing means 10 are configured by a distributing unit 14 comprising a roughly L-shaped partition plate 13 that temporarily stops a passing coin-type IC card, and a drive unit 15 that drives that distributing unit 14 so that it turns.

However, the present invention is not limited to or by the embodiment described in the foregoing, and the coin-type IC card distributing means 10 may be configured by a wall body that temporarily stops a passing coin-type IC card, a distributing lever that distributes the coin-type IC card temporarily stopped by that wall body to either the coin-type IC card collection path 5 or the coin-type IC card return path 6, and a drive unit for driving that distributing lever.

Figure 9:
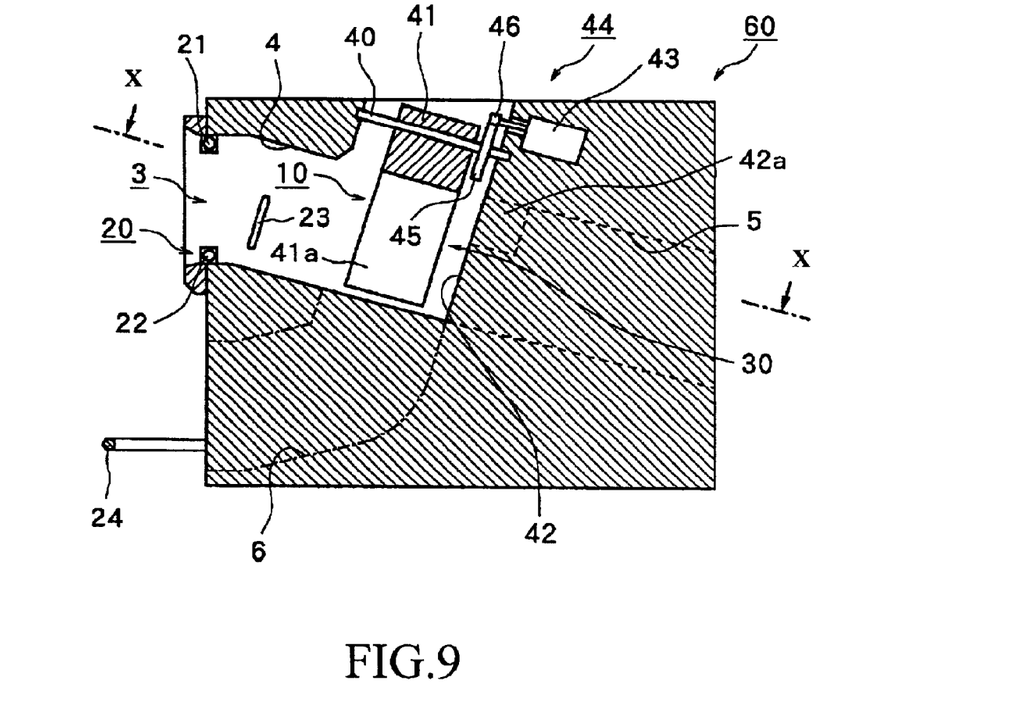
FIG. 9 is a front cross-sectional view of another embodiment of the coin-type IC card reader/writer according to the present invention.
Figure 10:
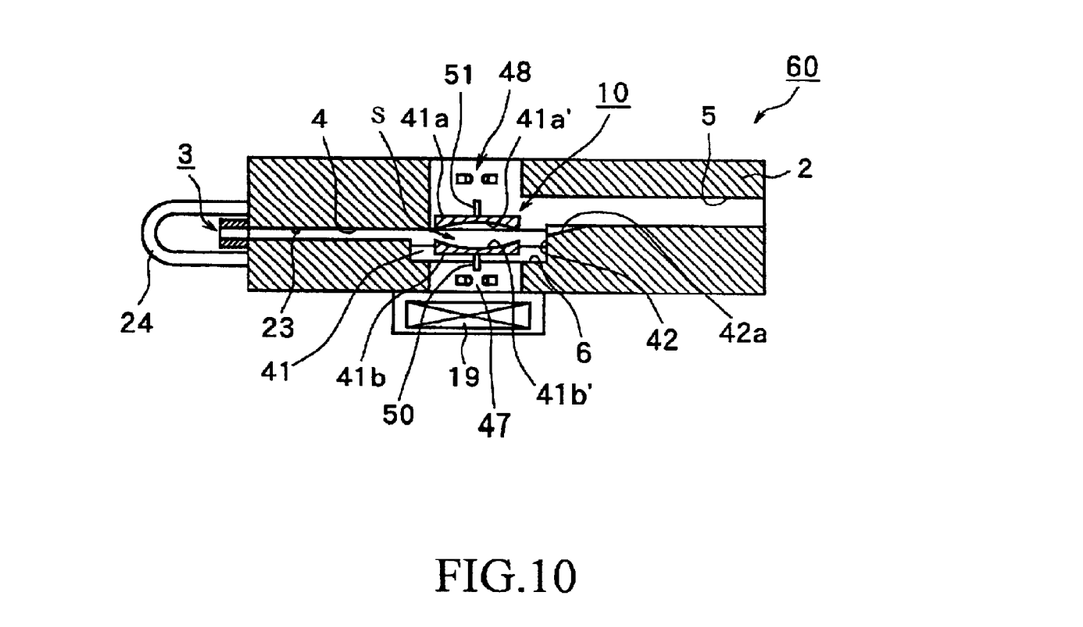
FIG. 10 is a schematic sectional view taken along line X—X in FIG. 9.
Figure 11:
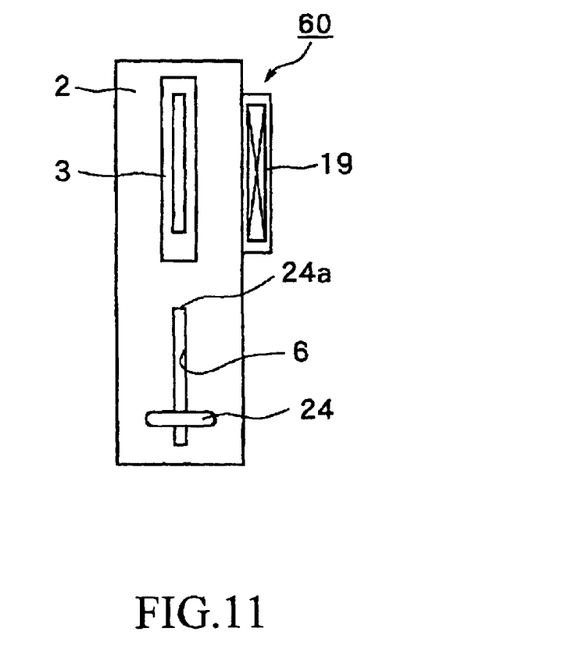
FIG. 11 is a left side view of this another embodiment of the coin-type IC card reader/writer.

FIG. 9 is a front cross-sectional view of another embodiment of a coin-type IC card reader/writer 60 according to the present invention, FIG. 10 is the X—X section in FIG. 9, and FIG. 11 is a left side view of the coin-type IC card reader/writer illustrated in FIG. 9, with the same parts as in FIG. 1 designated in these figures by the same reference numerals.

This coin-type IC card reader/writer 60 also, as illustrated in FIG. 9, has coin-type IC card distributing means 10 provided at the branch point 30 of a coin-type IC card guide path 4, a coin-type IC card collection path 5, and a coin-type IC card return path 6.

The coin-type IC card distributing means 10 of the coin-type IC card reader/writer 60 illustrated in this FIG. 9 comprise a shaft 40 suspended in the longitudinal direction of the coin-type IC card guide path 4 so that it can freely turn at the branch point 30, a distributing lever 41 that is secured to that shaft 40 and supported so that it can turn freely about the shaft 40 in a direction perpendicular to the plane of the diagram, and, as illustrated in FIG. 10, a wall body 42 between the upstream ends of the coin-type IC card collection path 5 and the coin-type IC card return path 6 that are mutually offset from a centerline formed by the coin-type IC card guide path 4, and, as illustrated in FIG. 9, a drive unit 44 comprising a motor 43 for causing the distributing lever 41 to turn about the shaft 40.

Also, as illustrated in FIG. 10, an inclined wall 42a is formed between the wall body 42 described above and the upstream end of the coin-type IC card collection path 5 to facilitate passage of the coin-type IC card to the upstream end of that coin-type IC card collection path 5.

The drive unit 44 described above comprises a follower gear 45 secured to the shaft 40 and a pinion gear 46 of the motor 43 that engages that follower gear 45.

As illustrated in FIG. 10, furthermore, an antenna coil 19 is provided on one side of the frame 2 at a position that is in opposition to the distributing lever 41 for supplying electric power to and inputting and outputting data to and from the coin-type IC card without making contact therewith.

Now, the distributing lever 41 described in the foregoing is configured such that the leading end thereof branches into a pair of guide plates 41a and 41b as illustrated in FIG. 10, with a gap S formed therebetween into which the coin-type IC card is inserted. The inner circumferential surfaces 41a' and 41b' of these guide plates 41a and 41b are formed in the shape of curved planes so that they can smoothly guide a coin-type IC card inserted therebetween, as will be described subsequently, to the downstream coin-type IC card collection path 5 or coin-type IC card return path 6.

Furthermore, as illustrated in FIG. 10, inside the frame 2, at positions in opposition to the outer sides of the pair of guide plates 41a and 41b, are provided turning position detection sensors 47 and 48 for detecting the turning position of the distributing lever 41 about the shaft 40 (FIG. 9). These turning position detection sensors 47 and 48, moreover, comprise a pair of light emitting and light receiving elements, and on the outer side surfaces of the pair of guide plates 41a and 41b are provided shielding plates 50 and 51 that traverse the turning position detection sensors 47 and 48.

Furthermore, as illustrated in FIG. 10, the distributing lever 41 is fashioned so that, in the initial position thereof, the gap S between the pair of guide plates 41a and 41b of that distributing lever 41 coincides with the longitudinal direction of the coin-type IC card guide path 4, and so that a coin-type IC card being sent rolling through that coin-type IC card guide path 4 will be smoothly inserted in the gap S between the guide plates 41a and 41b.

The operation of the coin-type IC card reader/writer 60 described in the foregoing is described next, and the configuration thereof is described in greater detail.

Figure 12:
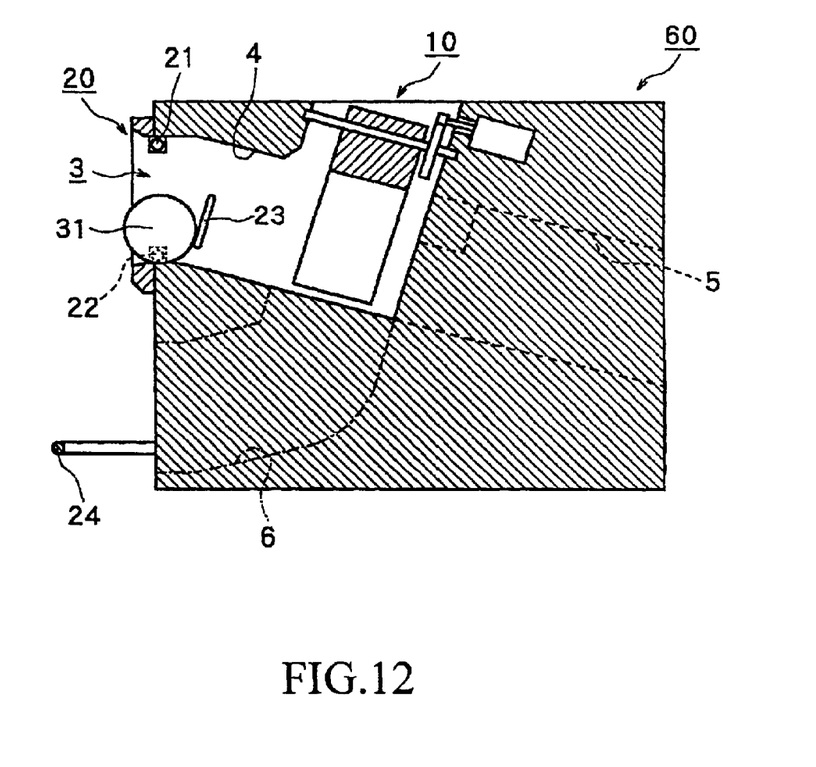
FIG. 12 is a front cross-sectional view illustrating the operation of this another embodiment of the coin-type IC card reader/writer.

As is illustrated in FIG. 12, wherein the same parts as in FIG. 9 are designated by the same reference numerals, a coin shaped object 31 having a diameter smaller than the specific coin diameter is deposited in the IC card deposit slot 3.

When a coin shaped object 31 having a diameter smaller than the specific coin diameter is deposited in this manner into the IC card deposit slot 3, that coin shaped object 31 will interrupt only the lower sensor 22 of the pair of photosensors 21 and 22 configuring the coin diameter detection means 20, wherefore, based on the detection signal therefrom, a control unit (not shown) will judge that the deposited coin shaped object 31 is not a coin shaped object having a specific size diameter, and will therefore maintain the restriction on the coin-type IC card guide path 4 by the shutter 23.

Accordingly, a coin shaped object 31 having a smaller than specific diameter will be prevented from entering the coin-type IC card guide path 4 by the shutter 23.

Figure 13:
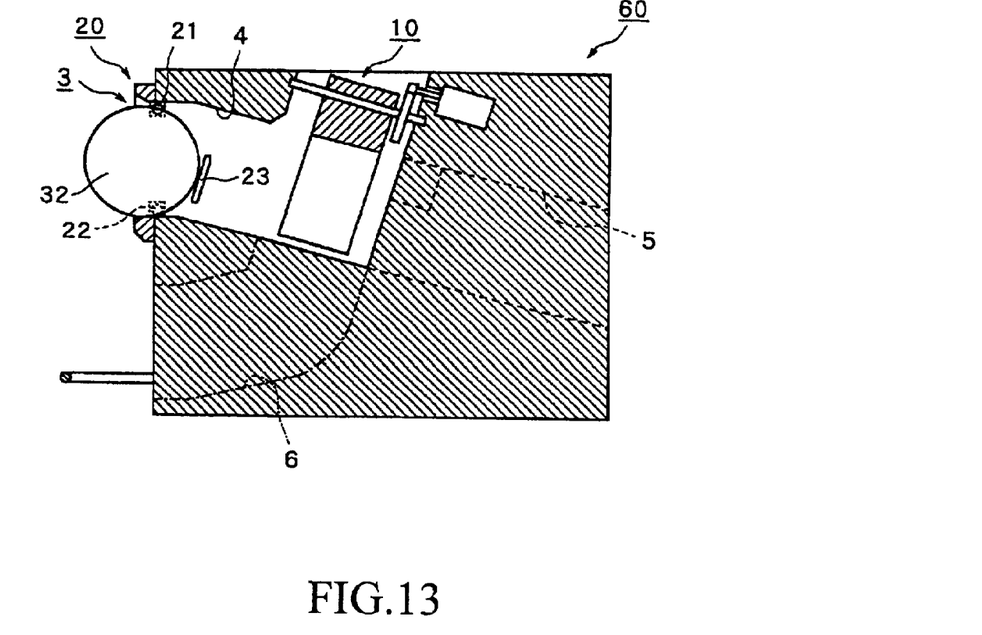
FIG. 13 is a front cross-sectional view illustrating the operation of this another embodiment of the coin-type IC card reader/writer.

Next, when a coin-type IC card 32 that is a coin shaped object of specific diameter is deposited in the IC card deposit slot 3, as illustrated in FIG. 13, that coin-type IC card 32 will, due to its diameter, interrupt both of the pair of photosensors 21 and 22 configuring the coin diameter detection means 20, wherefore, based on the detection signal therefrom, the control unit (not shown) will judge that the deposited coin-type IC card 32 is a coin shaped object having a diameter of specific size, and thus will release the restriction on the coin-type IC card guide path 4 by the shutter 23.

Figure 14:
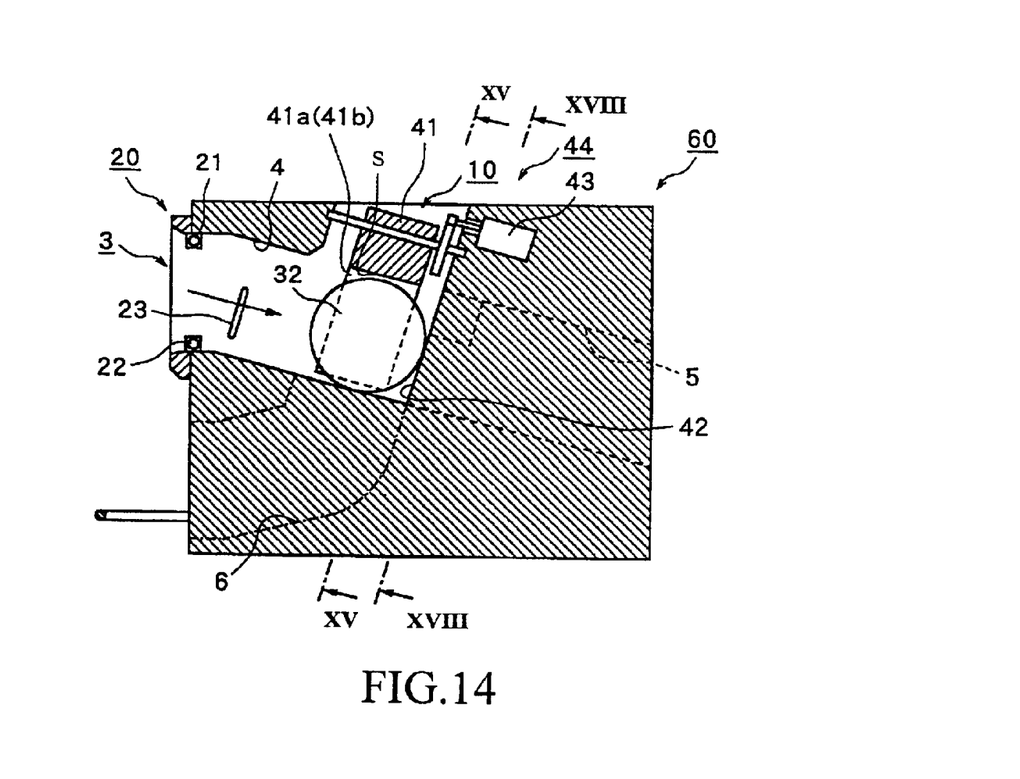
FIG. 14 is a front cross-sectional view illustrating the operation of this another embodiment of the coin-type IC card reader/writer.

When the restriction on the coin-type IC card guide path 4 by the shutter 23 is released, in this manner, the deposited coin-type IC card 32 will, as illustrated in FIG. 14, roll along the coin-type IC card guide path 4 and be guided downstream. After that, the coin-type IC card 32 will be inserted in the gap S between the pair of guide plates 41*a* and 41*b* of the distributing lever 41 coinciding in its initial position with the longitudinal direction of the coin-type IC card guide path 4, and will then strike the wall body 42 located downstream therefrom where it will be temporarily stopped and held.

The control unit (not shown), meanwhile, after releasing the restriction by the shutter 23, begins to supply electric power to and to input and output data to and from the coin-type IC card 32 that is stopped as illustrated in FIG. 14, through the antenna coil 19 illustrated in FIG. 10.

Then the control unit accesses the monetary data stored beforehand in the IC chip module (not shown) imbedded in the coin-type IC card 32, reads out that monetary data, compares that read out monetary data with the monetary data required for the game, and, if that read out monetary data is larger than the monetary data required for the game, sends a signal to enable game execution, subtracts the monetary data used for the game from the monetary data so read out, and performs processing to overwrite the existing data in the IC chip module with the monetary data having the value resulting from that subtraction.

When the control unit (not shown) has finished the processing for writing the monetary data having the value resulting from the subtraction to the coin-type IC card 32 in this manner, it next determines whether or not the monetary data having the value resulting from that subtraction is 0.

Figure 15:
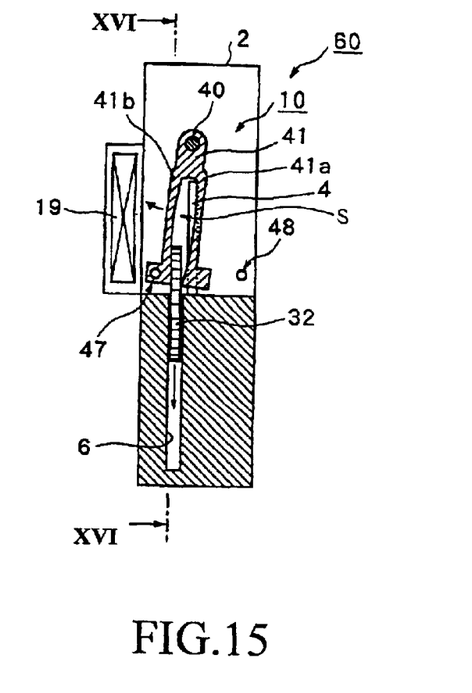
FIG. 15 is a sectional view taken along line XV—XV in FIG. 14.

When the monetary data overwritten to the coin-type IC card 32 is greater than 0, the control unit drives the motor 43 of the drive unit 44 illustrated in FIG. 14 so that it turns in one direction, and, thereby, as illustrated in FIG. 15 that represents the XV—XV section of the coin-type IC card reader/writer illustrated in FIG. 14, the distributing lever 41 configuring the coin-type IC card distributing means 10 is caused to turn through a prescribed turning angle, in the counterclockwise direction, about the shaft 40.

When the distributing lever 41 turns through the prescribed turning angle, in the counterclockwise direction, about the shaft 40 in this manner, then, based on the turning position detection signal for the distributing lever 41 output by one of the turning position detection sensors 47 illustrated in FIG. 15, the control unit (not shown) stops the motor 43 of the drive unit 44 illustrated in FIG. 14.

Figure 16:
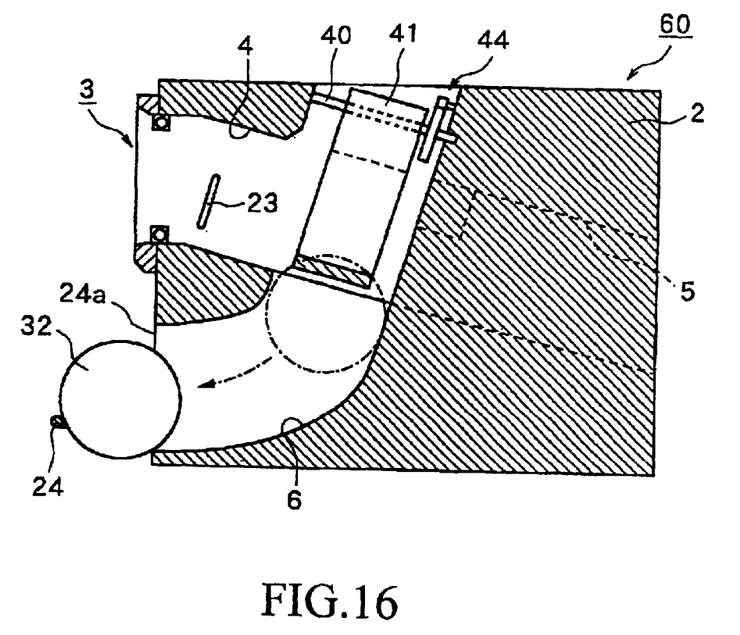
FIG. 16 is a sectional view taken along line XVI—XVI in FIG. 15.

Thereupon, as illustrated in FIG. 15, the coin-type IC card 32 inserted in the gap S between the pair of guide plates 41*a* and 41*b* of the distributing lever 41 shifts away from the wall body 42 (FIG. 10), is inserted at the upstream end of the coin-type IC card return path 6, and then, as illustrated in FIG. 16 which represents the XVI—XVI section of the coin-type IC card reader/writer illustrated in FIG. 15, is sent rolling through that coin-type IC card return path 6 toward the card return slot 24*a*, as indicated by the arrow, and is returned, in a condition wherein it is arrested by the positioning ring 24.

Figure 17:
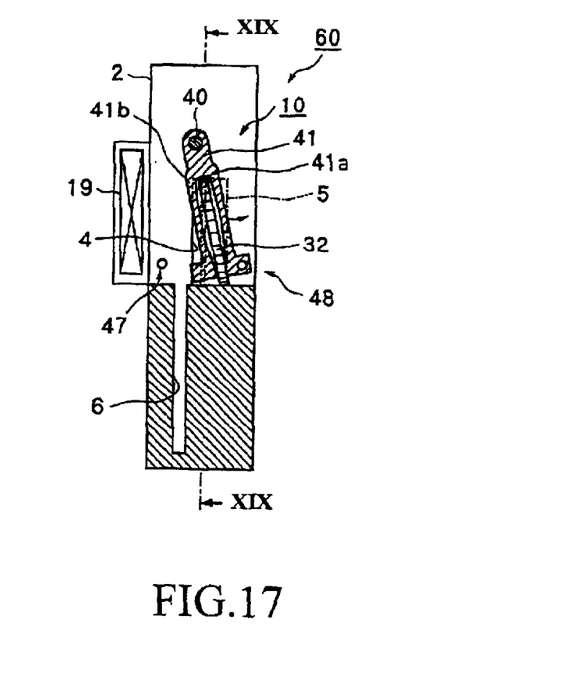
FIG. 17 is a sectional view taken along line XV—XV in FIG. 14.

When the monetary data written to the coin-type IC card 32 is 0, on the other hand, the control unit drives the motor 43 of the drive unit 44 illustrated in FIG. 14 so that it turns in the other direction and, thereby, as illustrated in FIG. 17 which represents the XV—XV section of the coin-type IC card reader/writer illustrated in FIG. 14, causes the distributing lever 41 configuring the coin-type IC card distributing means 10 to turn through a prescribed turning angle, in the clockwise direction, about the shaft 40.

When the distributing lever 41 turns through the prescribed turning angle, in the counterclockwise direction, about the shaft 40 in this manner, then, based on the turning position detection signal for the distributing lever 41 output by the other turning position detection sensor 48, the control unit (not shown) stops the motor 43 of the drive unit 44 illustrated in FIG. 14.

Figure 18:
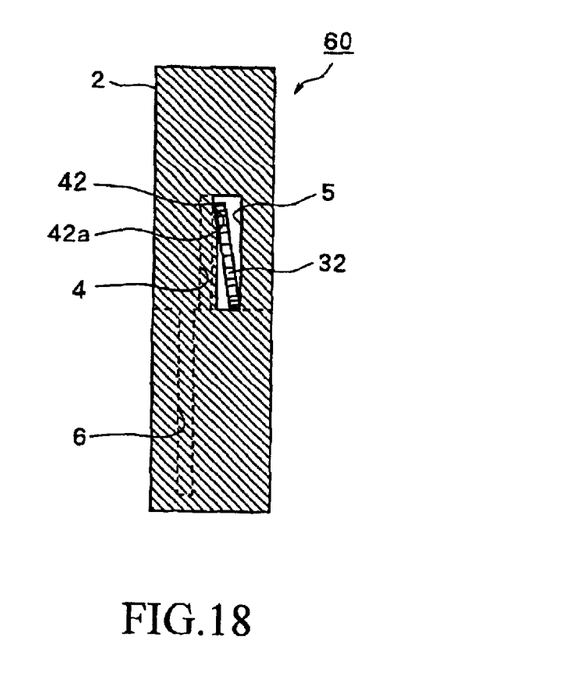
FIG. 18 is a sectional view taken along line XVIII—XVIII in FIG. 14.
Figure 19:
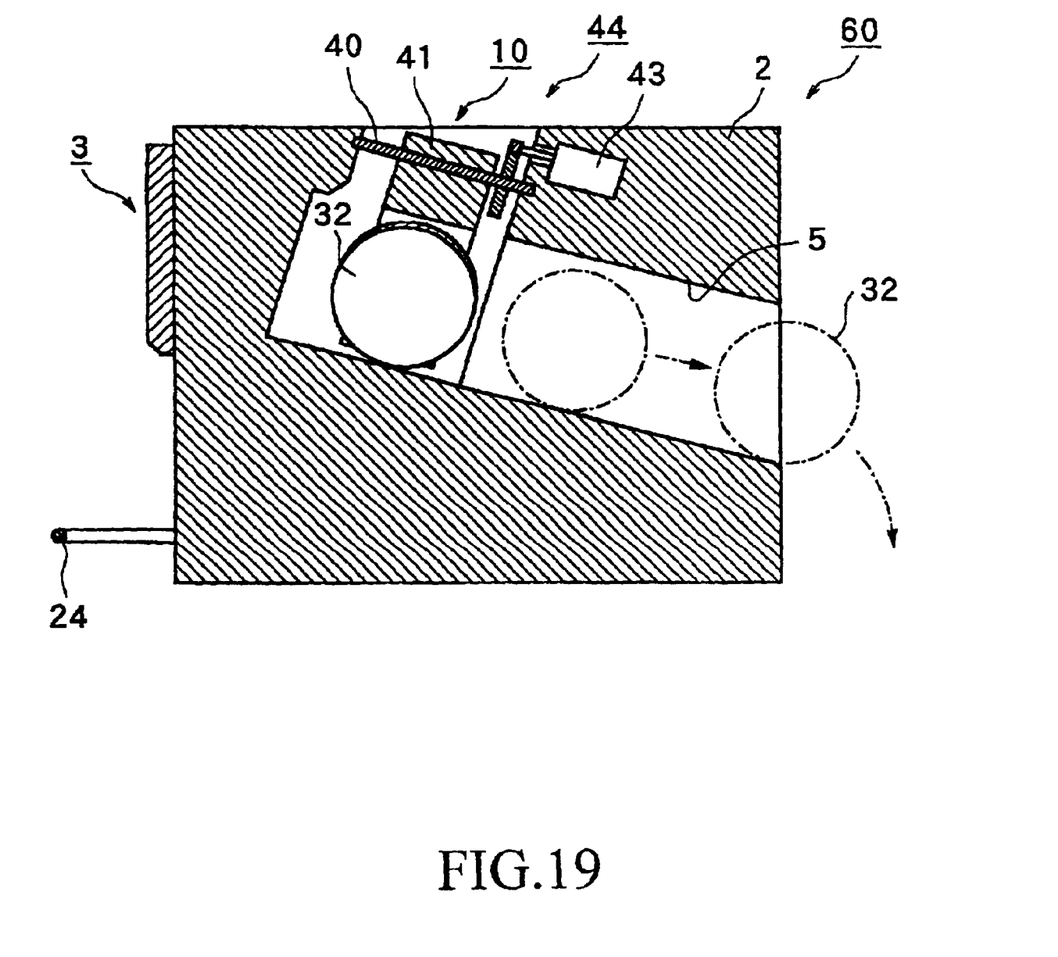
FIG. 19 is a sectional view taken along line XIX—XIX in FIG. 17.

Thereupon, the coin-type IC card 32 inserted in the gap S between the pair of guide plates 41*a* and 41*b* of the distributing lever 41 shifts away from the wall body 42, as illustrated in FIG. 18 which represents the schematic section XVIII—XVIII of the coin-type IC card reader/writer illustrated in FIG. 14, then smoothly fits in the upstream portion of the coin-type IC card collection path 5 along the inclined wall 42*a*, and, after that, rolls through the coin-type IC card collection path 5 as illustrated in FIG. 19 which represents the XIX—XIX section of the coin-type IC card reader/writer illustrated in FIG. 17, is sent rolling along as indicated by the arrow, and is collected in a coin-type IC card collection box (not shown) from the downstream end thereof.

Furthermore, the control unit (not shown), after causing the distributing lever 41 of the coin-type IC card distributing means 10 to turn through a prescribed turning angle, about the shaft 40, as described in the foregoing, when a prescribed time has elapsed thereafter, drives the motor 43 of the distributing means 10 illustrated in FIG. 9 so that it turns, causes the distributing lever 41 to return to the initial position indicated in FIG. 10, and causes a return to the condition for receiving the next coin-type IC card.

Furthermore, as illustrated in FIG. 14, the control unit (not shown), after starting to supply electric power to and inputting and outputting data to and from the coin-type IC card 32 that is temporarily stopped, when it has judged that the coin shaped object treated as a coin-type IC card 32 is not in fact a coin-type IC card, performs the same processing as the processing indicated in FIG. 16 and returns that coin shaped object to the card return slot 24*a*.

In the embodiment described in the foregoing, the antenna coil 19 is provided on one side of the frame 2 at a position that is in opposition to the distributing lever 41, as illustrated in FIG. 10, but the present invention is not limited to or by this embodiment, and the antenna coil 19 may be provided such that it is secured to the outer side wall itself of one or other of the guide plates 41a and 41b in the pair of guide plates 41a and 41b configuring the distributing lever 41.

With the coin-type IC card reader/writer of the present invention, as described in the foregoing, provision is made so that a coin-type IC card rolling along inside a coin-type IC card guide path is temporarily stopped, and processing is performed for reading and writing data to and from that stopped coin-type IC card, wherefore a coin-type IC card reader/writer can be provided wherewith errors in writing data to and reading data from coin-type IC cards can be reduced to the extent possible, and data that is accurate and stable is written to and read from the coin-type IC cards.

The present invention can be embodied in various other aspects without departing from the essence or main features thereof, for which reason the embodiments described in the foregoing are in all respects nothing more than mere examples and must not be interpreted as limiting. The scope of the present invention is indicated by the claims, and is in no way restricted by the text of the specification. Furthermore, all variations and modifications belonging to a scope equivalent to that of the claims are within the scope of the present invention.

What is claimed is:

1. A coin-shaped IC card reader/writer which performs processing of reading data from a coin-shaped IC card and writing data to the coin-shaped IC card while the coin-shaped IC card is rolling along and passing through an interior of a coin-shaped IC card guide path, comprising:

coin-shaped IC card distributing means in the coin-shaped IC card guide path, for performing the processing of reading data from the coin-shaped IC card and writing data to the coin-shaped IC card while temporarily stopping the rolling movement of the coin-shaped IC card, and based on results of the processing, distributing the coin-shaped IC card to another coin-shaped IC card guide path disposed separately from the first-mentioned coin-shaped IC card guide path, wherein the coin-shaped IC card distributing means comprise:

a shaft rotatably supported at one end of the first-mentioned coin-shaped IC card guide path, the shaft being adapted to form one side of side walls of the coin-shaped IC card guide path;

L-shaped partition plate formed at around a peripheral edge of a leading end surface of the shaft and protruding from the leading end surface, for retaining the coin-shaped IC card at a position opposite a central portion of the shaft and for opening and closing an upstream end of said another coin-shaped IC card guide, in conjunction with turning of the shaft; and a drive unit for driving the shaft;

an antenna coil opposite the coin-shaped IC card retained by the partition plate and the central portion of the shaft, through which data is read from and written into the retained coin-shaped IC card; and wherein the shaft is rotated while the coin-shaped IC card is maintained opposite to the central portion of the shaft.

2. The coin-shaped IC card reader/writer according to claim 1, wherein said another coin-shaped IC card guide paths comprises a coin-shaped IC card collection path for collecting the coin-shaped IC card and a coin-shaped IC card return path for returning the coin-shaped IC card.

3. The coin-shaped IC card reader/writer according to claim 2, further comprising a positioning ring provided at a terminal end of the coin-shaped IC card return path, for position and supporting the coin shaped object guided through the IC card return path.

4. The coin-shaped IC card reader/writer according to claim 1, further comprising coin diameter detection means provided at a card deposit slot formed at a starting end of the first-mentioned coin-shaped IC card guide path, for detecting whether or not a diameter of a coin shaped object deposited in a card deposit slot has a specific size.

5. The coin-shaped IC card reader/writer according to claim 4, further comprising a shutter provided in the first-mentioned coin-shaped IC card guide path, for opening and closing the first-mentioned coin-shaped IC card guide path based on detection signals of the coin diameter detection means.

6. A coin-shaped IC card reader/writer which performs processing of reading data from a coin-shaped IC card and writing data to the coin-shaped IC card while the coin-shaped IC card is rolling along and passing through an interior of a coin-shaped IC card guide path, comprising:

coin-shaped IC card distributing means in the coin-shaped IC card guide path, for performing the processing of reading data from the coin-shaped IC card and writing data to the coin-shaped IC card while temporarily stopping the rolling movement of the coin-shaped IC card, and based on results of the processing, distributing the coin-shaped IC card to another coin-shaped IC card guide path disposed separately from the first-mentioned coin-shaped IC card guide path, wherein the coin-shaped IC card distributing means comprise:

L-shaped distributing lever at one end of the first mentioned coin-shaped IC card guide path supported so as to be rotatable in a direction at right angles to a direction of advance of the first-mentioned coin-shaped IC card guide path, and comprises a pair of guide plate being arranged with a predetermined distance therebetween so as to form a gap of a predetermined width for inserting the coin-shaped IC card therein;

a wall body that temporarily stops the coin-shaped IC card passing through the interior of the first-mentioned coin-shaped IC card guide path in a condition where the coin-shaped IC card is inserted into the gap of the distributing lever; and drive mean consisting of a single drive unit for driving the distributing lever.

7. The coin-shaped IC card reader/writer according to claim 6, wherein inner circumferential surface of the guide plates are formed in curved surface shapes.

8. The coin-shaped IC card read/writer according to claim 7, further comprising a rotating position detection sensor provided at a position adjacent to the distributing lever, for detecting rotating position of the distributing lever.

9. The coin-shaped IC card reader/writer according to claim 6, wherein said another coin-shaped IC card guide paths comprises a coin-shaped IC card collection path for collecting the coin-shaped IC card and a coin-shaped IC card return path for returning the coin-shaped IC card.

10. The coin-shaped IC card reader/writer according to claim 6, further comprising coin diameter detection means provided at a card deposit slot formed at a staring end of the first-mentioned coin-shaped IC card guide path, for detecting whether or not a diameter of a coin shaped object deposited in a card deposit slot has a specific size.

11. A coin-shaped IC card reader/writer which performs processing of reading data from a coin-shaped IC card and writing data to the coin-shaped IC card while the coin-shaped IC card is rolling along and passing through an interior of a coin-shaped IC card guide path, comprising:

coin-shaped IC card distributing means in the coin-shaped IC card guide path, for performing the processing of reading data from the coin-shaped IC card and writing data to the coin-shaped IC card while temporarily stopping the rolling movement of the coin-shaped IC card, and, based on results of the processing, distributing the coin-shaped IC card to either one of another two coin-shaped IC card guide paths branched from the first-mentioned coin-shaped IC card guide path, the branched another two coin-shaped IC card guide paths being arranged to be mutually offset from a centerline formed by the first mentioned coin-shaped IC cad guide path, wherein the coin-shaped IC card distributing means comprise:

a shaft suspended in a longitudinal direction of the first-mentioned coin-type IC card guide path so as to be freely rotatable at a branch end of the first-mentioned coin-type IC card guide path;

L-shaped distributing lever comprising a pair of guide paths arranged along the longitudinal direction of the first-mentioned coin-type IC card guide path with a gap of a predetermined width formed therebetween, the distributing lever being secured to the shaft and rotatably supported along the longitudinal direction of the first-mentioned coin-type IC card guide path;

a wall body that temporarily stops the coin-shaped IC card in a condition where the coin-shaped IC card is inserted into the gap between the pair of the guide plates; and drive means consisting of a single drive unit, for rotating the distributing lever about the shaft in a direction at right angles to a direction of advance of the first-mentioned coin-shaped IC card guide path, whereby the distributing lever distributes by the rotation thereof the temporary stopped coin-shaped IC card to one of the another two coin-shaped IC card guide paths.

* * * * *